(12) United States Patent
Orfali

(10) Patent No.: US 7,039,834 B1
(45) Date of Patent: May 2, 2006

(54) HIGH SPEED PROCESSOR INTERCONNECT TRACING COMPACTION USING SELECTABLE TRIGGERS

(75) Inventor: Marwan A. Orfali, Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 895 days.

(21) Appl. No.: 09/745,813

(22) Filed: Dec. 21, 2000

(51) Int. Cl.
*G06F 11/00* (2006.01)

(52) U.S. Cl. .......................................... 714/39; 714/43
(58) Field of Classification Search ................... 714/39, 714/43
See application file for complete search history.

(56) References Cited

U.S. PATENT DOCUMENTS

| | | | | |
|---|---|---|---|---|
| 5,513,338 A | * | 4/1996 | Alexander et al. | 703/28 |
| 5,608,867 A | * | 3/1997 | Ishihara | 714/47 |
| 5,729,678 A | * | 3/1998 | Hunt et al. | 714/43 |
| 5,737,520 A | * | 4/1998 | Gronlund et al. | 714/39 |
| 5,850,512 A | * | 12/1998 | Song | 714/43 |
| 5,933,594 A | * | 8/1999 | La Joie et al. | 714/26 |
| 6,052,774 A | * | 4/2000 | Segars et al. | 712/200 |
| 6,233,531 B1 | * | 5/2001 | Klassen et al. | 702/80 |
| 6,351,724 B1 | * | 2/2002 | Klassen et al. | 702/186 |
| 6,396,517 B1 | * | 5/2002 | Beck et al. | 345/771 |
| 6,601,196 B1 | * | 7/2003 | Dabral et al. | 714/43 |
| 2003/0126508 A1 | * | 7/2003 | Litt | 714/39 |

OTHER PUBLICATIONS

Microsoft Computer Third Edition, pp. 202, 446.*
IEEE 100 The Authoritative Dictionary of the IEEE Standards terms 7th Edition, pp. 1089 and 446.*

* cited by examiner

*Primary Examiner*—Robert Beausoliel
*Assistant Examiner*—Bryce P. Bonzo
(74) *Attorney, Agent, or Firm*—Michael B. Atlass; Mark T. Starr

(57) ABSTRACT

In particular, a system and method for receiving high speed processor bus traces for study of computer system capacity and operation uses a small FIFO memory and skips unused bus cycles to avoid the requirement for memory speed to match the processor bus speed. A time stamp is obtained to match each processor word to a time of occurrence to facilitate study of the trace data. Triggers are established to capture only those processor words that appear on the bus and which are also of interest. The remaining words are compacted by removing parts of the words that are not of interest from those words that remain in the queue based on the trigger criteria.

20 Claims, 11 Drawing Sheets

HIGH SPEED PROCESSOR INTERCONNECT TRACING COMPACTION USING SELECTABLE TRIGGERS

RELATED APPLICATIONS

Filed on even date herewith are application Ser. Nos. 09/747,046 and 09/747,050, which have substantially similar or identical disclosure to the disclosure contained herein but which claim different inventions.

A portion of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to computer system design tools and more particularly to systems and methods for enabling rapid retrieval, use, and analysis of the operations of microprocessors or other instruction processors by providing a record for analyzing the signals present on their busses. Designs are described for on-the-fly removal of useless trace data and for handling multiple trace streams simultaneously to produce a coherent data file.

2. Background Information

In designing computer systems, one needs to have sufficient data about the performance characteristics of the elements of the computer system being used. Instruction processors, particularly, have unique ways of behaving in the presence of varied tasks given them. Accordingly, a system for maintaining a complete record or trace is required to enable the recovery of all data on the instruction processor busses while they handle various tasks in various computer architectures. The variability of the computer architecture can cause sharp differences in the tasks required of the instruction processors. Accordingly, the performance of the instruction processor in the environments of the various possible architecture designs is a critical component of the knowledge required to produce effective computer architecture designs. Such knowledge permits appropriate restructuring of designs by for example, using a larger cache or main memory if system throughput should be improved by such a change under a given set of use assumptions.

One important use of trace data is to use it to simulate a running process on an emulated computer system under design. For the simulation to be valid, steady state run information should be reflected in the trace data from a test system recovered (by using this invention, for example) that can be used in a simulated system for testing the simulated system. As is explained more fully within, obtaining appropriate sample data for running such simulated systems is not feasible with prior art test equipment.

Systems previously or currently used for testing computer system components share common elements with trace systems used to store the output of instruction processors. For example, in a patent issued in 1985 to Babcock, U.S. Pat. No. 4,550,287 (incorporated herein by this reference), a hand held instrument would show the states of wires, thus giving a visual indication of data activity on a tested line. More complex information could be gained by comparing test bit patterns when a microprocessor fault occurred with bit patterns from the microprocessor under test, as was shown in Pri-Tal's U.S. Pat. No. 4,622,699, also incorporated by this reference hereinto. In Song's U.S. Pat. No. 5,850,512, (also incorporated herein by this reference) it was shown that test data can be provided by a testing system and traces of the output can be stored in a bus tester and analyzed. La Joie et al, in U.S. Pat. No. 5,630,048, also incorporated by this reference thereto showed similar functionality to Song, and provided for second monitoring to perform boundary scan testing.

Currently both Agilent Technologies and Tektronix manufacture logic analyzers that can record signals from a processor bus, but neither of these is capable of providing a sufficient length of time for the trace data to reach steady state, a requirement for doing reliable system design analysis. One has to know with some degree of certainty that the cache state is what would normally be expected, and that cannot be achieved within the sub-second of trace data such systems can currently manage. The high end Agilent logic analyzer (model numbers 16555/56/57 or 16700) with either their E2487C or E2496 (for 64 bit words) probes can only achieve at maximum configuration for three probes 32 Mega-entries of storage. While various techniques described herein can make the use of smaller memories more useful, in order to be confident of attaining steady state with a large cache of a several megabytes or so size, it is estimated that 8 gigabytes of trace data would be required. Accordingly the costs of producing test equipment designed like the currently commercially available systems which require a large high speed memory to keep up with the processor bus are commercially untenable.

To reiterate, the problem with using currently available commercial test equipment for large scale test tracing to facilitate computer system design is that none of this equipment is built to accommodate large volumes of data at the natural rate and form in which it is generated. Test blocks of data such as would be available from such test devices, as described or listed above, do not provide sufficiently useful information for facilitating design of the features or arrangements of components of computer architectures. Thus, cache sizes, inter-processor and processor-to-memory pathways, and overall system design can be enhanced by permitting the designer to focus on the important characteristic of how much data is being processed through any given computer and cache architecture design. This contrasts with prior data sets from tracing which provide insight on how the data is being processed or whether it is being processed correctly using a limited signal-by-signal view of a short period of bus usage.

Accordingly there is a strong need to have a cost effective tool for designing high throughput systems, and especially for designing multiprocessor computer systems, that will accurately provide large bodies of useful trace data. Further, it is important that such a tool will provide such bodies of data in a form easy to analyze at a reasonable cost.

The ability to keep up with the modern high-speed instruction processor makes this particularly challenging, since memory speeds are often far less than the speed with which the processors and processor busses can operate.

Accordingly, there is a need to provide methods and systems for reducing the amount of high speed memory required to capture long traces.

Further, in multiprocessor systems, the interaction between the instruction processors may affect overall system throughput, so analysis of the data of is several or all instruction processors on a bus (or other set of interconnections) simultaneously and the ability to match traces generated by each of them becomes important. The ability to capture trace data from different, unconnected processor busses simultaneously is also an important capability lacking in the present state of the art. Thus, a way to keep the trace data effectively organized and matchable with respect to time of generation of each independent instruction processor stream becomes important as well.

SUMMARY OF THE INVENTION

Figure 1:
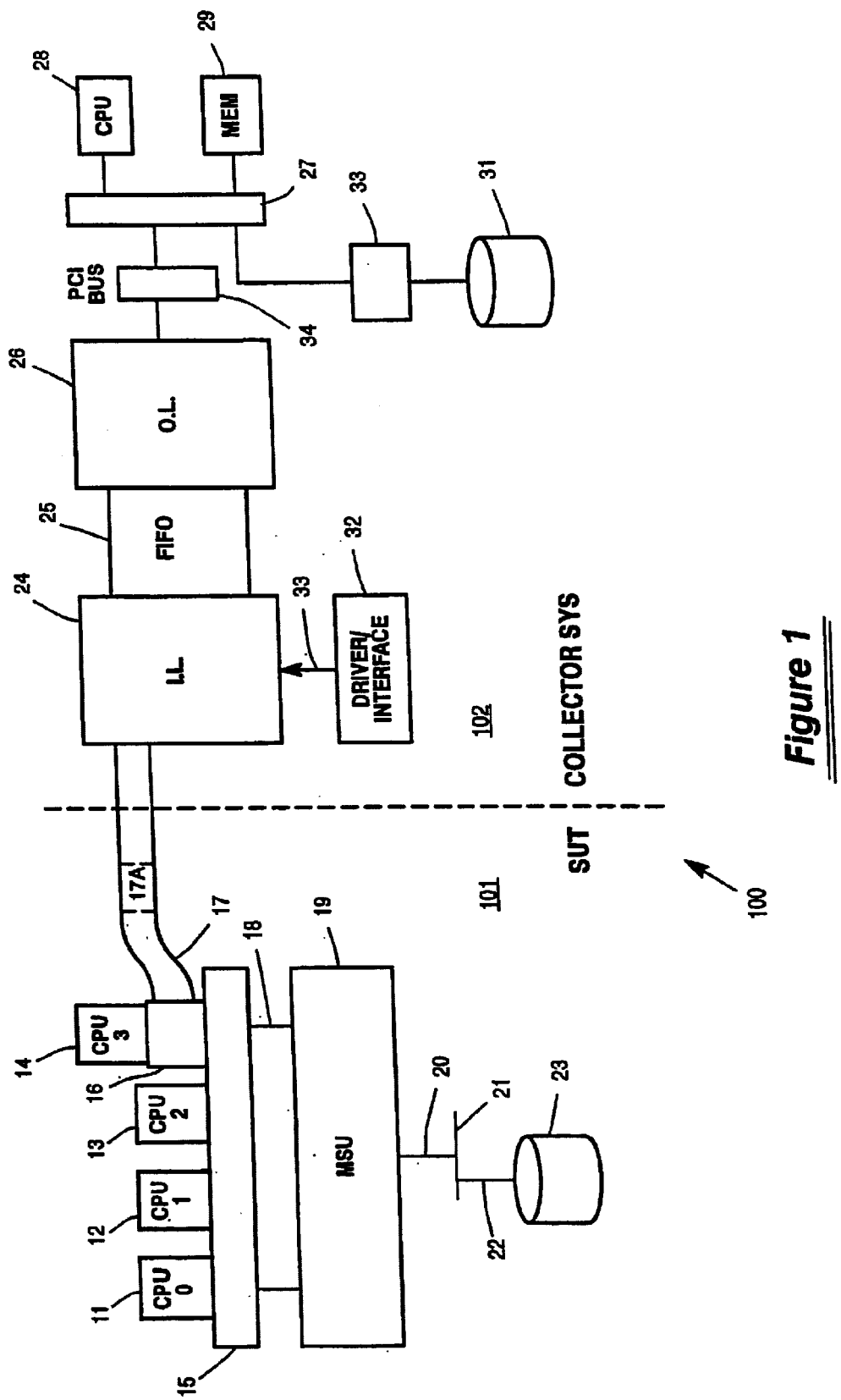
FIG. 1 is block diagram of a system including a system under test and a collector system in keeping with the teachings of a preferred embodiment of the invention.

Trace data collection is facilitated using equipment tied to an instruction processor bus. The equipment receives information at a speed commensurate to that of the bus, and organizes it into a dynamic FIFO memory buffer running at the clock speed of the processor bus. This dynamic FIFO buffer is, during a trace capture operation, constantly recovering data at the speed of the processor component interconnect or bus, but much of the available cycle bandwidth able to accommodate traffic is not captured. This is because unused cycles are ignored by the inventive system. Some kind of reference or trigger must be present in order for the inventive apparatus to capture the trace data.

The trace data is offloaded from the FIFO buffer at a substantially reduced speed and into a main memory system of another computer system, called a collector system. The collector computer system is preferably of a basic design such as a PC with a large main memory. From the collector system main memory it can be offloaded into permanent storage systems attached to the PC-type collector computer system for analysis at leisure after the trace is completed. This trace data can perhaps more importantly be used as test data in simulating analogous computer systems designs.

In accord with one aspect of the invention, non-useful clock cycles having no signals of interest are discarded prior to saving any into the high-speed buffer, thus allowing the storing of data in memory to sustain the collection rate. In other words, since smaller amounts of data are collected by the FIFO, the transfer of data from the FIFO to the "PC" main memory can proceed at a rate less than the clock rate of the bus cycles on the processor bus of the System Under Test, with limited risk of FIFO overflow.

Different ways to accomplish this are discussed for two instruction processor types.

Additionally, in designing multiprocessor systems analyzing the trace data related in time between processors is important so a system for organizing the trace data streams from various processors around concurrent times of activity is provided.

If the processor communication protocol used on the bus is a pipelined protocol, in addition to removing unused cycles completely, partially used cycles are not permitted to fill entire entries. Instead the pieces of the pipelined signals are aligned into a single entry in a process we refer to as de-pipelining. De-pipelining is based on the appearance of an alignment reference in the trace data input. Other alignment occurs for non-pipelined processor bus signals too, in a different embodiment.

The series of signals which are pipelined for a single processor communication may be called a "word".

Also supported are non-bus interfaces, and in one particular embodiment, processors have a direct link to the input channel to the collector system instead of requiring an interposer between the processor and its interface.

It should be noted that the preferred embodiment also supports a "direct" mode, which collects all trace data, clock cycle by clock cycle, that is particularly useful for data cycles (i.e., not instruction words) of some protocols. Data cycles are typically "full" in that they use all the lines in a given clock cycle of the interconnect or bus.

Another feature allows for compaction of the data collected and elimination of non-useful parts of it, effectively bracketing a segment of data from the input data stream, based on finding a trigger signal that matches the trigger in the trace data input. This is useful in any mode, including direct mode especially, where there is no alignment occurring in the collection of the trace data.

In all cases, a time-stamp records a timing signal in association with all is signals collected around each alignment reference and/or trigger.

We also provide for coordination of a plurality of trace collection systems, timed to put the same time-stamp in contemporaneously occurring spots in each collection system's collected data. This allows for collection of data relating to different things (processors or triggers or alignment references for examples) on a single bus in a multiprocessor system, or, related (or different "thing") data on multiple busses in a multiprocessor system, simultaneously. In this second use, especially, the data across the multiprocessor system will be temporally consistent and make using it for simulation more practical.

Many other features and limitations are described in the detailed description below.

DETAILED DESCRIPTION OF THE PREFERRED EMBODIMENTS

A system consistent overall with the teachings of this invention and in line with at least some of the objectives described above is illustrated in FIG. 1 as a single system 100 which is a combination of the system under test (SUT) 101 and collector system 102. It is preferred that a bus 15 within the SUT 101 (which could be a front-side bus, consistent with Intel processor design terminology or any other processor bus, such as for example the 2200 processor bus from Unisys Corporation) provide the pathway between the processors and a connection 18 to a memory storage unit 19 within the computer system 101 and is therefore a sensible sub-system to tap for this information. On this front-side bus 15 are four CPUs 11–14. (Any other connection that has all the signal traffic the instruction processor sees would be a reasonable alternative to bus 15 for these purposes.) In a multiprocessor configuration, the SUT 101 further may include multiple sub-units (not shown) similar to the sub-unit consisting of elements 11–19 as illustrated, or sub-units (also not shown) that are similar to the one consisting of elements 11–18 as illustrated depending upon the overall architecture of the computer system 101 under test. Thus, for example 1 NUMA architecture system would have a multiplicity of MSUs (19), each having sub-unit components with a processor bus and processor, whereas a multiprocessor design using a uniform memory architecture system might have many front-side buses (and thus many processors) connected the single MSU. However, a large part of the value of this inventive tool is that it can be used with any computer system architecture for gathering a large sized chunk of data about what is occurring on a high-speed connection like the processor front side bus.

Another interface 20 and/or a bus 21 connect 22 to data storage peripherals 23 and other peripherals in the system under test 101. Just a few of the many examples of computer systems that could operate as the SUT include the Unisys system ES5000, ES7000, Unisys 2200 processor systems of various kinds, the Sun Microsystems 10000, and nearly any others available from many vendors.

Although there may be other ways to connect the probe 16 to the front-side bus 15, in a commercial system the interposer or probe (which is a part of the type of trace equipment that was described in the background section as being available from Agilent Technologies, which for Intel Architecture (IA) 64 systems is currently model number E2496A) functions by employing a CPU slot on the front-side bus, interposed, preferably, between the CPU and the bus. Thus all the signals available to the front-side bus 15 will be available to the interposer 16 in the preferred embodiment. A cable 17 has as many lines as are available to front-side bus 16 in the preferred embodiment. (Or cable 17 could have less than all lines such that it had as many lines as would be of interest to the designer if the designer is interested in less than all of the lines. Thus if several lines are dedicated to address and data and for the particular design purpose, the designer is uninterested in these lines, those could be excluded from the cable 17). Cable 17 then, connects the system under test 101 through the interposer 16 to the collector system 102.

It should be noted that in the most preferred embodiment, a probe 17A (not shown in detail here but present in FIG. 8) may be located within cable 17. Such a probe may be used to enhance signal characteristics, eliminate some known and unwanted signal traffic, remove parasitics, correct the load, re-clock the data, and perform other signal enhancing functions which may be of value in retrieving bus signals and converting them to storage. Such devices are well known to practitioners in these arts.

The signals available from cable 17 will be captured by input logic 24 upon the receipt of initiation signal on input 33 from a driver/interface program 32 which may be running on the collector system 102.

In accord with various aspects and preferred embodiments of this invention, the input logic 24 may collect all the data available on cable 17 in a manner suitable to the designer. Details of the various manners which data can be collected are described below, but for the functioning of the basic hardware assume that every signal at every clock cycle of the front-side bus is collected by the input logic 24, upon initiation of the collection sequence. The FIFO buffer system 25 is also provided. The FIFO buffer must be fast enough to receive data at the rate at which signals appear the front-side bus 15, thus enabling all trace data to be capture. Thus, if the front-side bus is running at approximately 100 or 133 megahertz, the FIFO system must also be running at 100 or 133 megahertz.

However, as is commonly understood by those of ordinary skill in these computer arts, it is very rare for the front-side bus to be fully occupied for any large number of clock cycles with active signals (data/instructions/interrupts/et cetera—anything the processors on the bus would see or send out) for more than 50% of the time. Also, memory which runs at speeds paralleling instruction processor bus speeds is expensive. Accordingly, the preferred embodiment manages with only 8 kilo-entries by 144 bits of high-speed memory matched to the front-side bus speed in the FIFO buffer (or 128 bits depending on the processor bus being traced—or in fact, any other number that reflects the number of lines being traced plus the size of any control word data and time stamp information kept). As little as 2 kilo entries could support most systems under test, and the upper limit on the FIFO size is really a function of the cost of such high speed memory and one's budget. This lower limit is not a hard number and will vary in accord with the burstiness of the software being run. It will be most stressed only in the direct mode in which each cycle of the available trace data is captured.

Also, in an alternative preferred embodiment the entries are sent with extra bits that are used as control or meta-data signals to propagate information together with the trace data.

Such control or meta-data signals can include indications of the buffer becoming too full or other status indicators (such as a "this is a start-a-trace word" and another "the FIFO is half full" messages). They may indicate that a protocol modification is being encountered here as in an extension to the size of a series. For examples, if in some protocol an address or data field requires additional bus cycles to transmit, or if there is a short pipeline series occurring, the size of the series of bus cycles would increase or decrease before the next series of cycles can be controlled by a different processor in a pipelined protocol. Basically, meta-data can provide dynamic information on the operation of the system such as the status of the FIFO, occurrence of exceptions in the operation of the bus, and the like. One example of a variation or exception in the protocol can be snoop variability or number of retries, which can cause a series to be extended or shortened. A table shows some current control words: (LATCA is the short-hand name of the board that implements the invention in the earliest preferred embodiment. Presently, only the "StatusReg" and "TS Reg" signals are passed simultaneously with trace data. Other control words are passed prior to or after a trace session).

| Register Name | Sub-field Name | # Bits | Access | Description |
|---|---|---|---|---|
| TS_Reg | | 48 | R/W | Time stamp counter register. |
| PreTrigCnt | | 2 | R/W | Number of samples collected before the trigger occurred. |
| PostTrigCnt | | 16 | R/W | Number of samples collected after the trigger occurred. |

-continued

| Register Name | Sub-field Name | # Bits | Access | Description |
|---|---|---|---|---|
| ControlReg | | 8 | R/W | |
| | Freerun | 1 | | When set the post trigger count is ignored and all vectors are captured until either data acquisition mode is disabled or the buffer memory fills. |
| | Retrigger | 1 | | When set causes the LATCA to re-arm itself and wait until another trigger condition is detected. Once a trigger is detected the number of samples taken is set by the pre-trigger count and the post-trigger count. |
| | EnSampPipe | 1 | | When set causes the LATCA to monitor the data stream and if a trigger is detected, within the data stream, to reload the post-trigger down counter with the PostTrigCnt. |
| | Unused | 5 | | Undefined. |
| SerialNumber | | 8 | RO | Contains a board unique serial number. |
| HWRevision | | 8 | RO | Contains the hardware revision. |
| StatusReg | | 8 | RO | Contains general operational status. Some bits are mode dependent. |
| | Overflow | 1 | | FIFO Overflow detected. |
| | Half-full | 1 | | FIFO is half or more full. This bit maybe set at the same time as FIFO Overflow. |
| | Restart | 1 | | FIFO Restart has occurred. |
| | Extension Cnt | 3 | | Number of extension periods that have occurred. |

The output logic 26 removes the information from the high-speed FIFO memory buffer 25 at a rate approximately one half of the speed on the front-side bus. Thus, this memory can be downloaded into a much larger memory system 29 within the collector system 102 under control of the driver/interface program 32, at a constant rate, which because of the intervening high speed memory buffer 25 and the space-saving contributions described herein can match the output of real-time data stream occurring on the front-side bus 15 in real time even though the memory 29 runs at half or even less than half of the rate of the front-side bus 15.

It will be understood that the collector system is a computer system having a central processing unit 28 and a local bus 27 which provides a link between the output logic and memory 29. In current PC-type computer systems this bus 27 may be connected to a PCI bus 34. The same or a different PCI bus provides connections to a controller 33 to transfer data to other systems such as disk drives or other peripherals. Clearly as PCI-X or other busses become available such improvements can be used with this invention. As in the SUT, the collection system 102 may be any similar and preferably modern system design, so long as it provides the needed functionality to support passing large amounts of data continuously to a main memory such as main memory 29 from an external port at no less than the speed at which the port is passing data to the memory.

The collector system will also have a memory storage device 31 (preferably a disk drive if using current technology) attached to it through an ordinary memory controller and bus system 30 which may operate as lower speeds to offload the large main memory 29 when a trace operation is completed. In the preferred embodiments the main memory 29 should be able to capture 8 giga-bytes of whatever the entries are within the design chosen for presumed steady state to have been achieved in a 16 megabyte cache. Larger caches, will require longer times for steady state to be achieved and thus, clearly, alter requirements for memory size. The size of the entry word is relevant too. For example, if the entry word is 102 bits plus 48 bits of meta-data or control signals (which if a time stamp uses the whole 48 otherwise the 48 bits are available for the other control words described above), the memory in the collector system should be able to stream into its main memory, 8 giga-bytes of the entries, plus the meta-data or control signals if that is useful to the user of the data. There is no theoretical size limit, of course, to the main memory into which the trace data is being loaded. The various ways of shrinking the requirements for this storage size that are taught herein may be applied as may be necessary or desirable.

Figure 5:
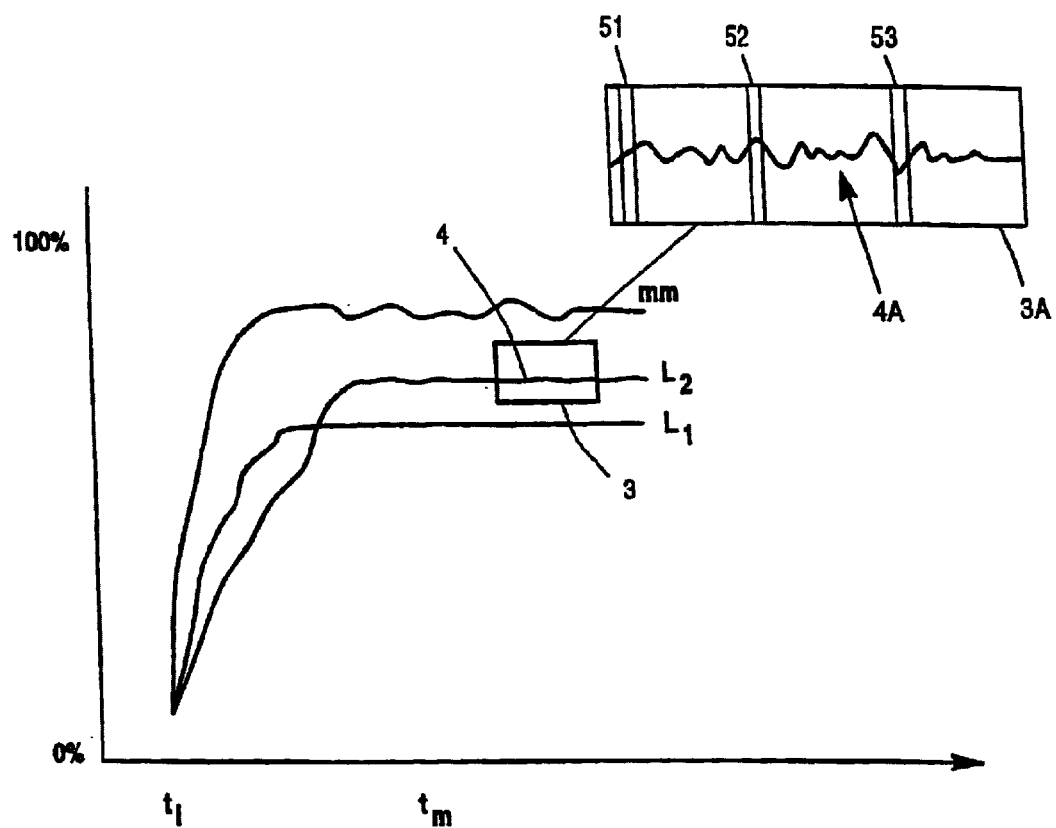
FIG. 5 is a graph of settling times.

Some mention should be made here of the meaning of steady state. Refer to FIG. 5 in which a graph of steady state cache use hit rates is drawn. Other metrics may also be measured that result in similar displays of information such as software lock rate, transaction throughput and so forth, but hit rate for requests for data that are satisfied by the cache provide a good heuristic metric for this discussion. The first kind of steady state is achieved from the time the process workload is applied to the system, and is represented by the lines L1, L2 and MM (for two levels of cache and a main memory), and the hit rates they are able to achieve as the process is starting to be handled by the computer system. Over a period of time they usually level out at a certain rough level. However, even if one skips the start up phase from $t_i$ to $t_m$, a very small sample will still skew the validity of the trace data collected from small samples. This can be more clearly seen in the enlarged section of curve L2 3 in which the line of the sample of the curve L2 4 is drawn in greater detail in box 3A as line 4A. As can be seen at sample segments S1, S2 and S3, the slope as well as the absolute value of the metric on this line 4A will be substantially different and rather unreliable if it is the only sample taken from the box 3 or 3A. Clearly, the information in the average values available from the entire box 3A will provide more useful and reliable data from which one can design a system. Also, the size of the excursion from average for most metrics gets larger as the cache size increases, at each level, up to and including parts of a main memory (which might be used as cache also, especially in NUMA system configurations).

Also, in the preferred embodiment, the PCI 64 standard is used running at 66 MHz because it is a convenient interface. Quicker interfaces than PCI with greater bandwidth would of course be acceptable.

Therefore, a collector system in accord with the presently preferred embodiment of this invention can be designed such that a single peripheral card can contain the high speed buffer and the required logic components in few chips. Two chips, preferably FPGA, one for the input logic and one for the output logic (both of which are preferably field programmable gate array chips so as to provide flexibility in redesign for different instruction processors) and a high speed memory buffer together won't fully populate a PCI board that fits into an ordinary PCI slot in a PC. Thus, the entire system can be plugged into an ordinary single processor personal computer type system having a large main memory system associated with it and an appropriate driver interface program to drive the card functions. The first function is to coordinate receiving the signals as will be explained below and the second function is to download the buffered data from the card into the large main memory 29 of the collector system 102.

One additional facet must be described and how it is handled also disclosed in order to produce a functioning system. As mentioned previously, it is well understood that the activities on the front-side bus 15 (the processor bus) will occur with an approximately 50% duty cycle except for extremely rare occasions. Thus, most clock cycles will occur with no activity on the front-side bus 15. Accordingly, data for those bus cycles can be compressed into almost no memory space, or even no memory space at all, if they are ignored by the input logic circuitry 24. Given that the actual fill rate of the FIFO is lowered to below the rate of the processor bus due to the fact the many processor bus cycles are ignored, there is no real limit to the amount of data the FIFO can process at the bus or interconnect speed, assuming the uncaptured cycles account for a sufficient proportion of the bus or interconnect cycles. However, the designer must take into account the "burstiness", or deviation from average, at which the software in the system under test will exhibit during the steady state trace being captured. The designer should adjust the size of the FIFO to handle the largest expected "bursts" of usage such software will likely provide. Also, if coordination between the elements of the system in design, whether they be the several processors on the bus or several busses, is of interest to the designer, a timestamp will be required which preferably is related to clock cycles rather than real time.

Figure 2:
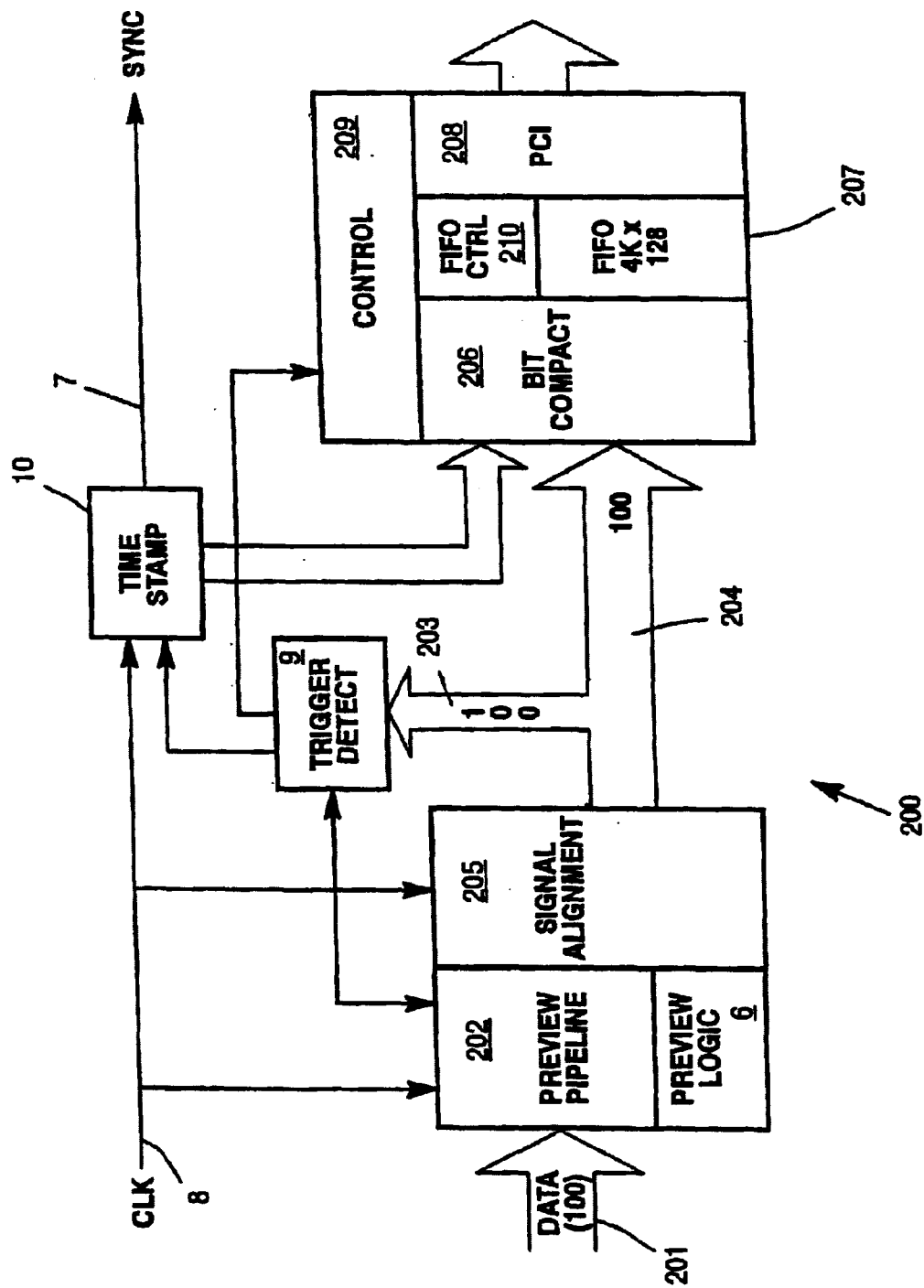
FIG. 2 is a block diagram of the logical component structure of a PC card for use in a collector system in accord with a preferred embodiment of the invention.
Figure 3:
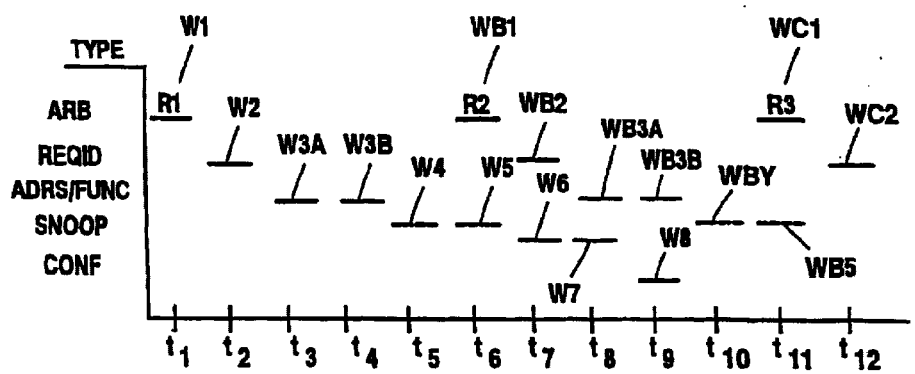
FIG. 3 is an illustration of raw data signals on a bus.

Refer now to FIG. 2 in which the logical component structure 200 is illustrated for the PC-type card that can be used in a PCI slot in a collector system computer, in accord with this invention. In the preferred embodiments all the components are on a single PCI card. The input data stream 201 comes in over the cable 17 (from FIG. 1), clocked in by a clock input 8. Trigger detect logic 9 can be used to establish which of the signals will be considered the start of a processor bus series. A previous logic circuit 6 can assist in providing alignment references as described in detail within. The processor or bus series for a typical pipelined protocol is described in more detail with reference to FIG. 3, where a pipelined set of three (3) such series is illustrated over 12 bus cycles. For most efficient reading of the activity of a processor in a computer system, the pipeline should be stored together. Accordingly, here in the preview pipeline block 202, the initial part of the pipeline protocol is noticed and aligned into the signal alignment block 205 as is described in more detail with reference to FIGS. 3 and 4 together, below. Clock signals regulate the flow timing. There are many circuits that can de-pipeline and align pipelined data and it is within the skill of the common artisan in this field to do so, so only the inventive particulars of our circuit are specified here. It is sufficient to know that if the triggering signal for alignment, hereinafter called an alignment reference is not at the beginning of the pipeline, the circuitry should be able to draw on the preceding signals in that pipeline for all the signals in a processor bus cycle to stay together in our alignment. In our example, the arbitration signal for the ownership of the bus precedes the processor ID signal which both precede the adrs/func signal, and the addrs/func signal is the reference for alignment in a preferred embodiment.

Accordingly, in the preferred embodiment example, the Arb signal at W1 and the ReqID signal at W2 should be stored into the same entry as the other data collected around the alignment reference W3A/W3B. Also, it is preferred that the clock cycle that reaches the time stamp block 10 when the alignment reference's pipelined processor bus cycle begins be stored with that processor bus cycle in the FIFO 207, but one could store the time stamp that occurs during the alignment reference itself too, so long as this is consistent or identified throughout the trace period.

Figure 12:
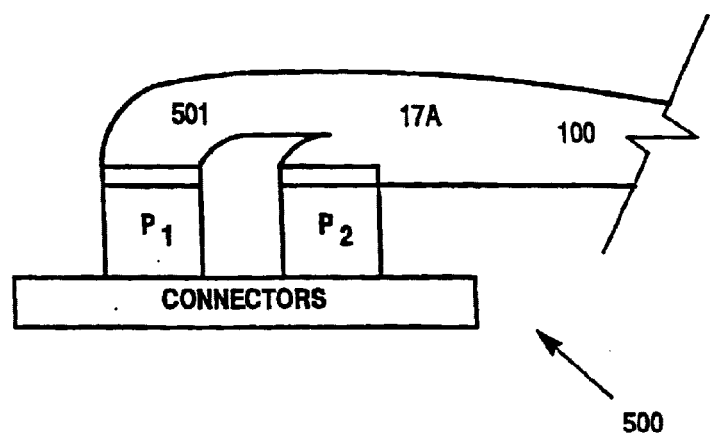
FIG. 12 is a block diagram of a part of a "2200" computer system connected to a collection system cable.

In another kind of system that this invention can perform tracing on, instead of a bus, processors themselves be tapped for data. In the 2200 architecture system from Unisys Corporation, such taps enable connections to two (2) processors having 50 bit wide busses each to be handled simultaneously with the equipment already described. In FIG. 12, two (2) such processors P1 and P2 are illustrated having connections to half each of cable 17A, the cable that will lead into the collection system (not shown in this illustration). An alignment scheme for such a system is described in greater detail with reference to FIG. 9, below, and it is important to mention here that a slightly different mode, we call dual mode, is used to handle this alignment. Activity of either processor acts as an alignment trigger, and the time stamp will have to be applied to both sets of signals through control block 209 as they are saved into the FIFO memory 207. The current Unisys 2200 instruction processor system currently requires an alignment scheme like that described with reference to FIG. 9.

It should be apparent that the alignment reference must match the needs of the protocol in a manner consistent with the examples described here, and in the preferred embodiments, the apparatus will set up alignment references for known protocol features. It should also be clear that alignment should be settable by a user of the system to provide flexibility in using the apparatus for various computer systems that may be used.

In either example, when there is no use of the bus (or other processor communications) we are tracing, since there are no pipelined or shared signals for a period, such periods are not stored, saving space in the FIFO.

The aligned data is passed into trigger detect logic (TDL) 9 on lines 203. The TDL 9 preferably determines by reading a whole aligned and de-pipelined word if a particular pattern that is being specifically monitored is detected in the aligned word. If such a sought-after word pattern is detected, the trigger detect logic 9 will send a signal to the control logic block 209 to cause it to process and capture the incoming data appropriately and allow it to be loaded into the FIFO, discarding other words.

Additionally, control logic block 209 may be used to exercise control over the bit compaction circuitry in block 206, preparing the collected trace data to be placed into a denser format for storage, whereupon they will be sent to the high-speed memory circuit block 207. A more detailed description of bit compaction is had with reference to FIGS. 6 and 7, below.

The FIFO logic 210 controlling the memory 207 will gate the data into and out of the memory area 207 and onto the PCI interface 208, which will transfer the data to the collector system. In the preferred embodiment, the time stamp will have been associated with each entry in the bit compaction phase, and the time stamp and any control words or meta data will also be stored into the FIFO.

Figure 11:
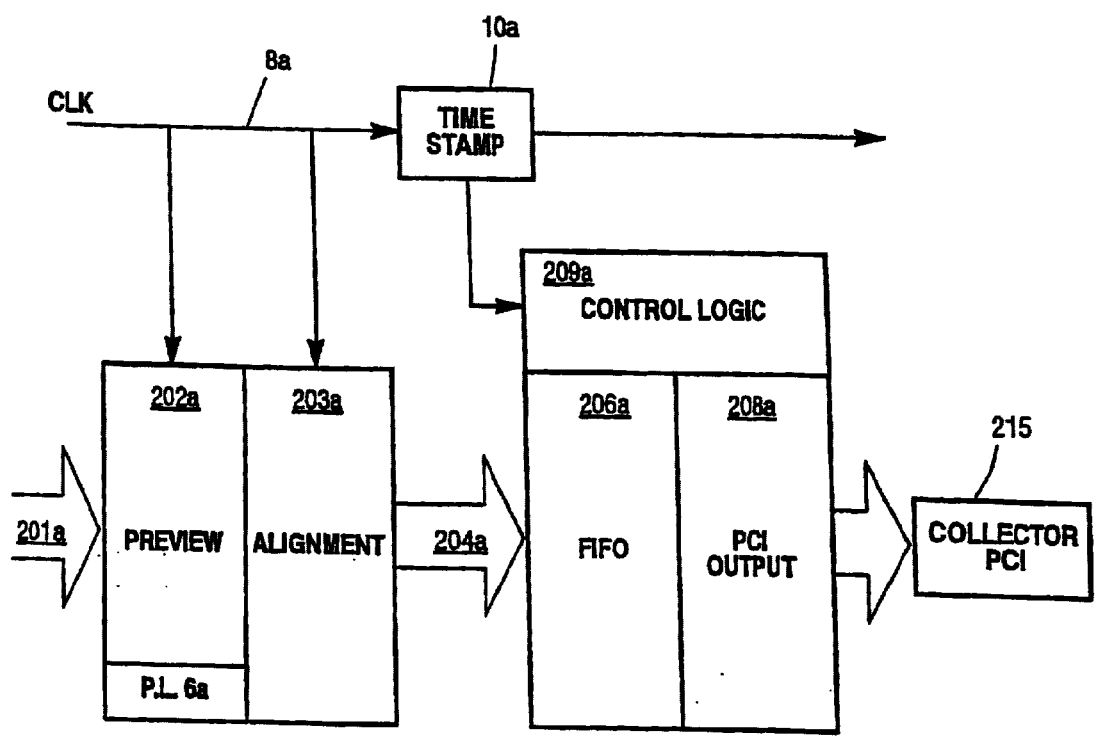
FIG. 11 is a block diagram of the logical component structure of another embodiment of the invention.

In one aspect, the invention can provide throughput of aligned entries without compaction circuitry, which after all, is a separate function from managing the collection of the processor bus signals that arrive as input from input 201. Accordingly, such a system is illustrated in FIG. 11 having sufficient preview logic 6a for alignment circuitry 203a to operate on previewed input reviewed against the alignment references provided by block 9a to preview circuitry 202a. Once aligned as entries, no further trigger review need be conducted (and in this embodiment trigger logic is not required), although the size of the FIFO may need to be greater, depending on the system under test and its characteristics in order to manage all the entries produced by the system under test without overflowing the high speed FIFO memory. Accordingly, the FIFO will in this simpler version of the inventive apparatus retain a time stamp for each entry in the same way as is described for the version with the compaction circuitry, and the PCI output logic will spool out the FIFO memory to the PCI bus 215 of the collector computer system in the same way too, through PCI output logic 208a.

It should also be noted that for some computer systems that may be used for collecting trace data, alignment of processor bus signals may not be required. In such systems the processor bus protocol would have the entire processor word on the bus as a signal in a single cycle, or in immediately succeeding cycles at least. Thus, the alignment circuitry and the alignment trigger could be removed from an apparatus using the other inventive features described herein, particularly the compaction circuitry and use thereof. Also, if data is being collected instead of processor communications, the bus may be full width, loaded with data, and alignment may not be needed for such information, even though compaction can be particularly helpful.

It is helpful to understand the input data stream or its protocol features in order to understand the functioning of these blocks in more detail. Accordingly, refer now to FIG. 3 in which a graph 300 illustrates the timing relationship between signal "entries" or words that are found on a bus during 12 (bus-related or processor output related) cycles ($t_{1-12}$). Each set of signals occurring in a cycle is represented by a solid line (W1–WC2) and has a full compliment of available bit lines for the bus available for that communication, thus, if there were 100 lines on the bus at W1, a subset of 100 of them may be committed to being available for the communication to arbitrate the bus ownership in communication type "ARB" at bus cycle $t_1$. However, in preferred embodiment systems the lines are used in a pipelined manner so that multiple groups of lines dedicated for different purposes can be shared between activities by different processors. So for example, a second arbitration occurs at cycle time $t_6$, while a wait state W5 occurs for processor R1; and at $t_7$, both a processor ID (signal WB2) and a snoop request (signal W6), directed by different processors occurs.

The set of functions illustrated here is for teaching purposes mainly and may vary with different processor types, but a preferred embodiment example is useful to illustrate the points here. In one preferred protocol, the signal in the pipeline of signals that puts the processor ID on the bus is at W3A and W3B for processor R1, WB3A and WB3B for processor R2, and WC3A and WC3B for processor R3. The address and/or function data for this sequence is also in signals W3A and W3B for processor R1. Time for snooping is available to processor R1 for this processor series at W6 and W7, and a "Conf" or confirmation function is in signal W8 at time $t_9$ for processor R1.

A sequential series of communications includes all of the eight types of signals shown here, because the instruction handling of this bus is pipelined in this protocol. In order to make it easier to read the useful information in the trace data, it will be advantageous to align all the signals a processor can have in a processing cycle in the bus pipeline. Accordingly, each signal related to R1 within this pipeline stream (W1–W8) will be placed in sequential order in a single entry 403 (FIG. 4) in the FIFO, then the series of signals from processor R2 (WB1–WB5, and WB6–8 which are not shown) will follow in a second entry 404. This alignment will eliminate the wasted or unused space in the pipeline and only the data will be maintained.

Figure 4:
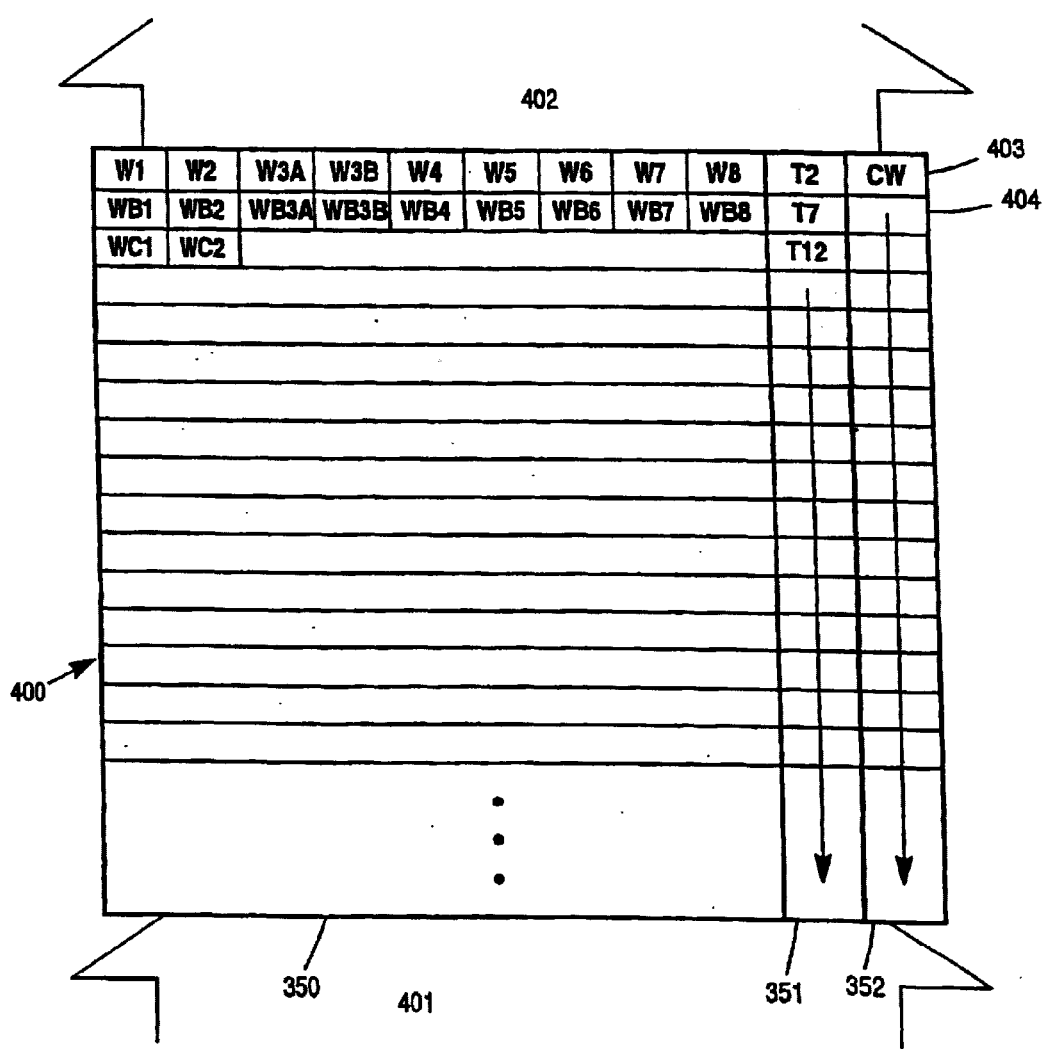
FIG. 4 is a heuristic ordered list view of the raw signals of FIG. 3 packed into a FIFO memory in accord with a preferred embodiment of this invention.

Refer to FIG. 4 for a detailed explanation of this alignment. From the input 401 to the output 402 of the alignment queue 400, entries are stacked in sequence order, all the communications of one processor for a sequence linked step by step in the entry section 350, accompanied by a time stamp in area 351 and a control word in area 352. Preferably, the time stamp (in area 351) will indicate the number of collector clock cycles that have passed since the start of a collection of a trace in area 351. The control word area 352 can have meta-data about the entry or functional signals indicating that, for example, whether the data collected is valid, if the FIFO is becoming full, how large the sample trace should be, whether there is an overflow, whether this is an extended count bus cycle, and so forth, as explained earlier.

To put this into context of the circuitry please refer now to FIG. 2.

The organization of the entries from aligned entry sequences to compacted data is accomplished with the help of trigger detection logic from trigger detect box 9, that monitors the input data stream on a word by word, or aligned entry by aligned entry basis, comparing the words or parts of them if desired, with known triggers. The key reference for finding a sequence to be aligned is the address/function signal which has a particular format for any particular computer system instruction processor. In the example in FIG. 3, the addr/func signal is found at $t_{3-4}$, immediately after the ReqID signal at $t_2$. To capture the full sequence of cycles $t_1$–$t_9$, the signals W1 through W8 will need to be captured into a single entry 403 of FIG. 4. Given this communications protocol required for communications on this particular bus in this particular computer system, the alignment circuitry will have to retain signals from before the trigger. The Arb signal at $t_6$ starts a new series of a processor bus cycle within the same protocol but for a different processor than the one using signals W1–W8. The laddr/func signal found at $t_{7-8}$ will initiate storage of each of these sequences into the data streams 203, 204 (from FIG. 2), seen as entry 404 in FIG. 4.

Figure 9:
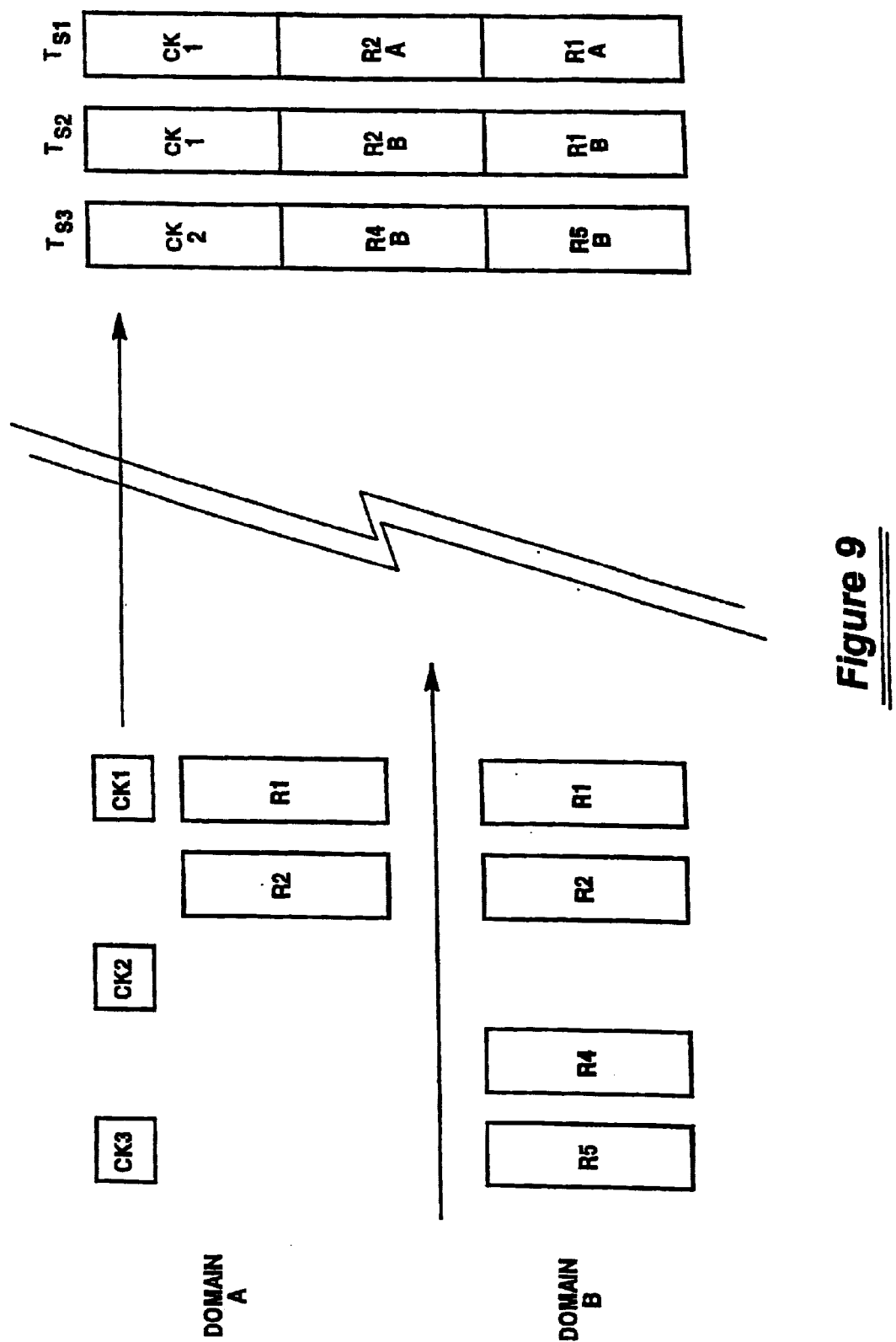
FIG. 9 is a diagram illustrating how dual mode alignment can be accomplished in accord with a preferred embodiment.

To provide that these will be aligned following the W1 series merely requires a buffering of the signals until the time for the first series has expired, which is well understood technology, and for which there are many techniques within the skill of the ordinary circuit designer. Capturing the R2 series while still capturing the R1 series merely requires sufficient buffering for these extended series possibilities in this protocol, plus an additional set for each potentially coextensive pipelined word. The buffer for this facility should be in the preview pipeline circuitry 202. To support a 2200 protocol (one used by some Unisys Corporation computer systems), the alignment reference occurs with any activity on either domain of the input cable's lines. A mode control function programmable through a user's access console to the collector system should enable this function. Refer briefly to FIG. 9 in which the two domains are designated Domain A and Domain B. In the figure, two R1 initial processor communications occur at the same time from a processor in Domain A and from a processor in Domain B. In this protocol, a processor uses the bus in two Cycles. The buffering needs to be modified so that the alignment can account for this and put the two parts of the series of processor bus signals together into a single entry. Here, the aligned entry from Domain A is clocked in at time stamp TS1 with a value CK1, as is the aligned entry from Domain B clocked in at time stamp TS2 with the same value CK1, since they both occurred at the CK1 cycle. This entry is packed with R1 and R2 in each instance since both processors on this bus produced two sets of signals as is appropriate for this protocol. The next entry does not occur until CK3, and the alignment trigger then sends the entry R4 R5 out on the data stream lines 203,204 along with TS3, having the value CK3.

With either protocol, or any other one that may be used with this invention, for the time during which nothing is in the data stream lines 203, 204, no entries are loaded into the FIFO memory. Since the duty cycle of the bus in the system under test is very rarely even 50%, the FIFO memory can handle tracing all the bus use signals easily, by streaming out whatever data it receives at even half the rate it receives it if the size of the FIFO is sufficient.

Also, given that various combinations of instruction data may be relevant (such as, for example, only the actual instruction data and the start of a processor cycle of bus use after a processor obtains the rights to the bus by arbitration) it is clearly advantageous to compact the data as it is streaming in so that the amount that needs to be loaded into the main memory of the collector system and eventually spooled out to disk storage will be reduced. This can reduce the cost and limit the size of main memory required for the collector system to the point where commercially available and inexpensive PC type computers can provide the functionality of the collector system with the PCI card in a PCI slot.

But alignment and not passing on blank cycles into the FIFO still uses substantial amounts of memory. Therefore, a bit compaction process and apparatus was developed to further reduce the amount of memory needed to store the trace information, by allowing it to contain just that information which the designer wants to see. The bit compaction can also function in direct mode without the benefit of alignment.

So for example, in a preferred embodiment, a select signal can be designed by the operator, and set up the bit compaction logic to pass only the wanted data in the entries. The bit compaction logic then reduces the amount of storage required by compacting the remaining data into smaller entry fields than whole entry words.

For example the functional lines, the address lines, and the control lines in the processor pipelined series that makes up the entry may be of interest in designing the system whereas the data that comes across on the data lines in the error correcting code lines may not be of interest to the computer designer.

The designer may want just the address, just the functional lines, or just the control to answer different questions. Or if a particular address range and its usage is of interest, the triggers for compaction can be set up based on the appearance of this range in the entry. For example, the designer may wish to know how long it takes to satisfy a request, who (i.e. which instruction processor) is satisfying which requests, in which order which requests are being satisfied, and so forth. This ability to select down to storing only those individual lines required for the particular analysis being performed is provided by this selection function. It thus provides for better overall bandwidth because smaller amounts of high speed memory in the FIFO are needed. In operation, the collection or capture of trace data proceeds as follows. If no indication is given that a range around an entry is within a user's interest is set by a user, only the entry is captured. If a range in front of (preceding in time) that entry is specified, the range of data within the indicated amount of cycles prior to the entry are also captured. Similarly, if a range of cycles/time/entries following the entry that matches the alignment reference (or trigger) is set, those entries within that range are captured in the trace data sent to the FIFO. Thus the trigger on a particular instruction or address for compiling a trace to study the emulation using data that relates to said particular address or instruction will have a signal that contains the desired trigger data pattern to establish the trigger within the trigger logic. The signals in the protocol prior to or after the occurrence of the matching signal to the trigger which are part of the entry should be collected, but if desired, as just described, only the trigger signal with its time-stamp could be collected. Also, all the traffic in-between triggers can be collected, or merely the trigger entries/words themselves, with their time stamps, depending on which kinds of information the designer needs and has programmed in to the trigger logic by his selection.

This also reduces the overall difficulty in combing through large trace data files, since their size is reduced as a consequence of this process. Overall, this selection therefore provides for better use of limited bandpass resources.

In preferred embodiments we call operate this selection process through Bit Compaction or "BC."

Figure 6:
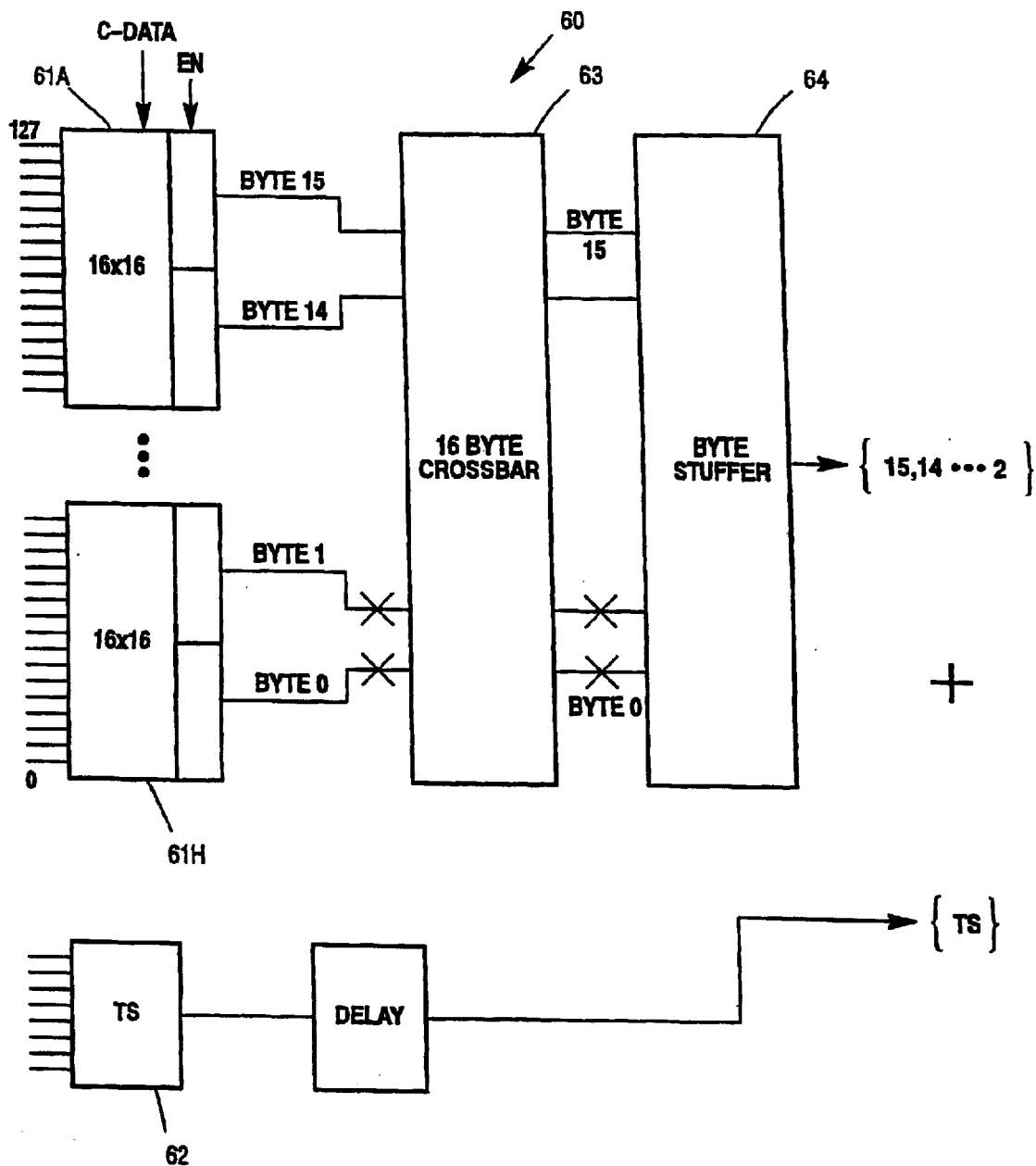
FIG. 6 is a block diagram illustrating bit compaction components.

Illustrated in FIG. 6, the BC logic 60 (also shown as 206 of FIG. 2) is configured by data entered from an operator console connected to the collector system. (The console is not illustrated, but typically would be a keyboard and monitor, although loading a file could operate as the key to perform the selection, a menu could be used with hand entry, or even a graphic interface allowing picking of entry parts could be used. The manner of providing the selection is not particularly important so long as selection is possible.) Although a single pre-ordered configuration for this bit compaction can be used, since this invention is primarily for use as a development tool, operator configurability is preferred). As configured, the BC logic will remove the sample signals that the operator specified are to be considered unused from operator input from the console, and the BC logic will pack the selected sample data, together with time stamp and any status information into maximally dense 128-bit words. In the event a sample is smaller than 128-bits the BC of the preferred embodiment can store multiple full samples in the 128-bit word, on byte boundaries. Recall that as indicated with reference to FIG. 2, the output of the BC logic 206 goes to the FIFO 207.

The BC circuit 60 of the preferred embodiment has eight (8) 16×16 bit selectors, which through the selection signals can be selected to output zero, one, the other, or both bytes of the word that enters them. The BC logic of the preferred embodiment is made up of 8 16×16 modified crossbar switches followed by a modified byte crossbar switch. This allows 128 bits to pass through if desired, or any byte less than 128, based on the selection, which here is driven into each 16×16 selector by a C-data line (only shown for selector 61A), and clocked through as output for each selector 61A–61H when the selectors are enabled (EN). In the example shown in FIG. 6, Bytes 0 and 1 are de-selected (indicated by X's on their illustrated output lines) so the final output will contain only bytes 15 down to byte 2. These will be dropped by a 16 byte crossbar 63 and the word resized by byte stuffer logic into a contiguous range of 111 bits that make up the compacted entry.

This architecture allows any or all unused signals in a 16-bit group to be de-selected using data lines like C-DATA to configure the appropriate de-selection in accord with the operator instructions of the preferred embodiment. The resulting selected signals are packed starting at the lowest bit position of the 16-bit group. The packed bytes are then selected by the modified byte crossbar switch and passed to the byte-stuffing portion of the BC. The byte stuffer takes the bytes with data in them and fits them into the 128-bit FIFO word. The byte stuffer works on power-of-two integral byte values of sample data. For example, if a sample is 32-bits then the byte stuffer would fit four sample words into each FIFO location. Thus the example given above using the BC circuit to eliminate only two bytes provides no opportunity to stuff more than one entry into a single 128 bit word in memory, but greater compaction will allow for that. Thus compaction down to 64 bits would allow two entries to be stored into one 128 bit memory space, for example. Using differently sized memory spaces could yield advantages for different situations that will be apparent to the reader.

Figure 7:
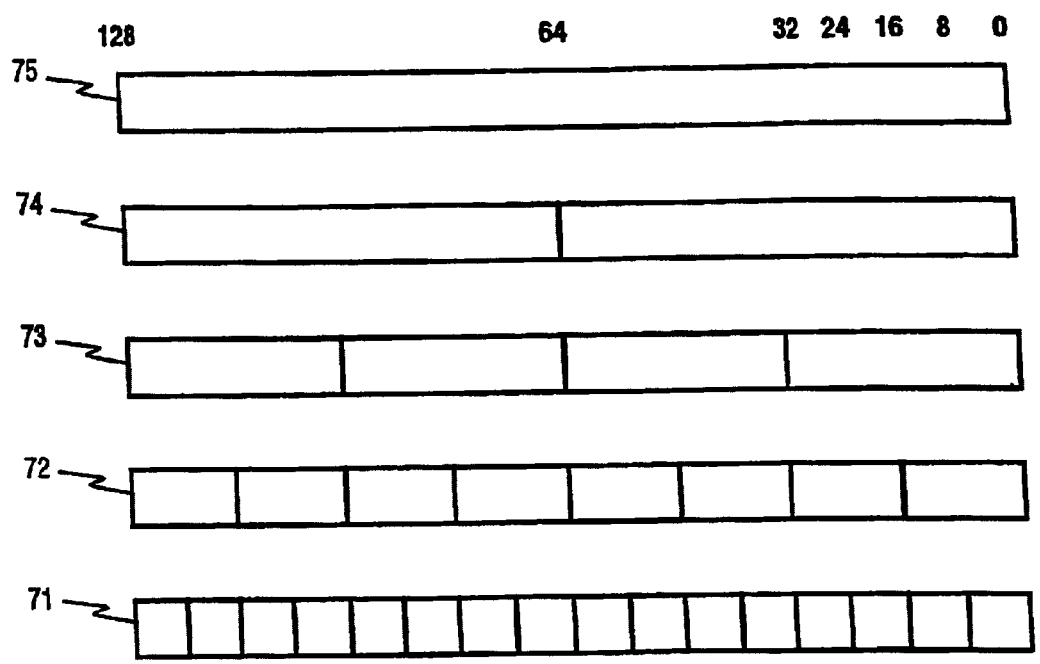
FIG. 7 is an organizational chart showing memory compaction ordering.

The supported formats are shown 7 in FIG. 7, as sixteen 8 bit samples 71, eight 16 bit samples 72, four 32 bit samples 73, two 64 bit samples 74, and one 128 bit sample 75.

Un-Pipelined Processor Modes

While processors that function in the way Intel processors do follow a multiplexed use of the bus for their functioning, some instruction processors do not. Notably, the 2200 family of processors from Unisys divides the multiprocessor bus into two domains, providing a challenge to enable use of the same trace equipment with both types of processor architectures. However, by simply identifying the type of processor type as one of the 2200 family that is using the bus in the system under test, the change in pipelining will be handled. With a dual word, dual domain bus processor protocol as illustrated in the aligning steps with respect to FIG. 9, compaction occurs in exactly the same manner as described above for a typical pipelined protocol. Parts of the words which are aligned can be dropped or de-selected by an operator as may be most appropriate for the testing being done of the system under test's performance.

System Process Flow

Figure 10:
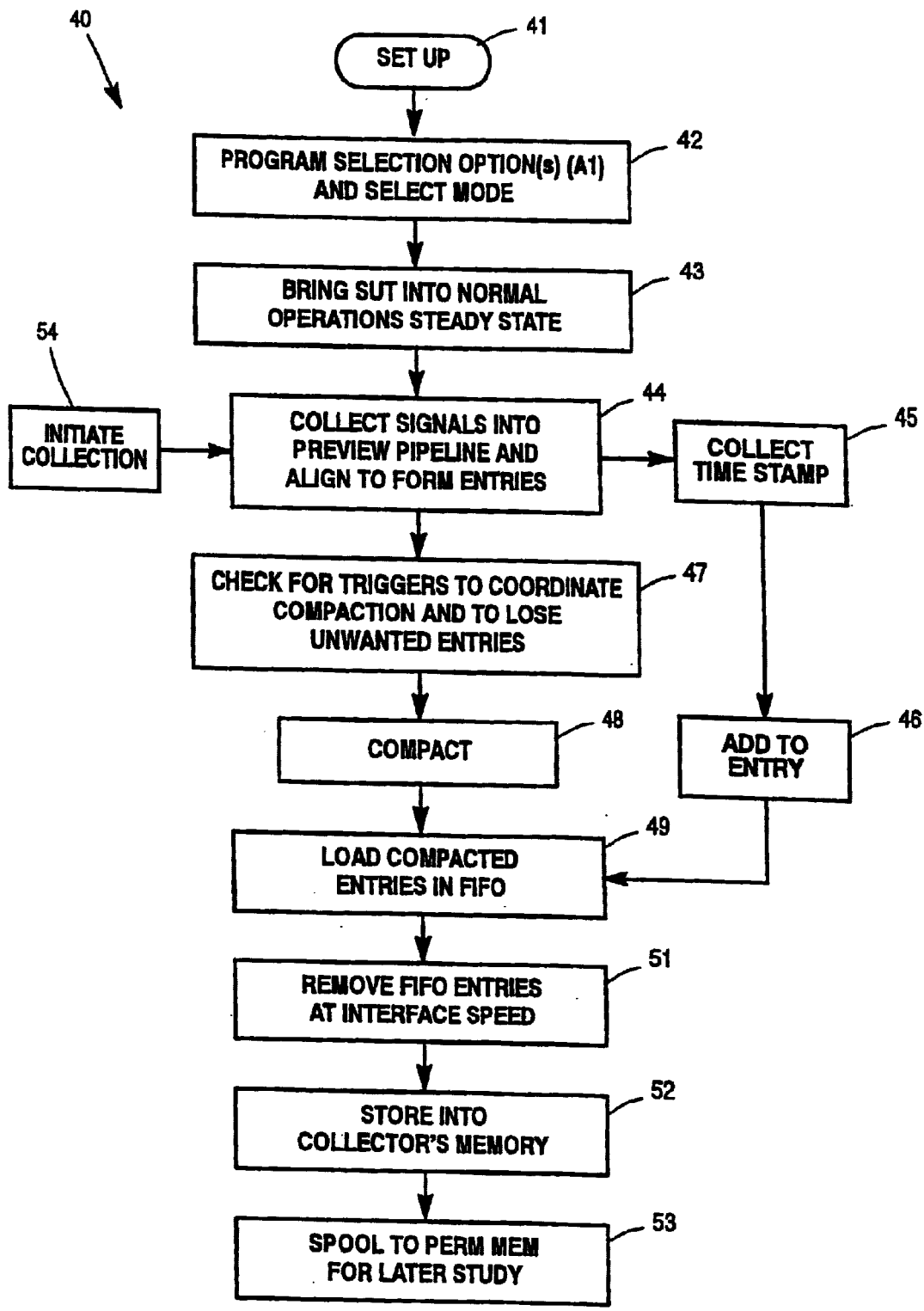
FIG. 10 is a flow chart outlining the process of preferred embodiment uses of this invention.

Refer now to FIG. 10 in which a flow diagram 40 of the collector system for tracing bus signals is outlined. The set up 41 is included here to indicate that the interposer and probe should be connected and tested and other arrangements made to the system under test to establish the conditions for testing. The programmed selection should be selected 42 for the triggers if triggers are being used. The System Under Test (SUT) should be brought on-line and be running until it reaches the steady state 43 needed for testing purposes. At that point, the initiation 54 of the collection can be started. This initiation may require a sending of a signal to more than a single collector system if multiple parts of a multiprocessor are being used together for the results desired (whether from the same bus or from different busses) as will be explained below. Then the signals should be collected 44 into the preview pipeline and aligned to form entries. A time stamp should be generated based on the number of clock signals from initiation which clears the time stamp value in the time stamp register and is then set to begin collecting trace signals. If the user has set the apparatus to collect based on the first trigger or alignment reference to occur, the collection starts then. If in direct mode, the apparatus just begins collecting all cycles immediately. The time stamp sequence is restarted immediately on receipt of the initiation signal, and the time stamp value for the collected trace data should be collected 45 also. The time stamp value will be compacted and annexed 46 to the entry by logic so that it moves into the FIFO memory word associated with that entry. The triggers set by the operator (or possibly automatically in some cases) should be monitored in the output stream from the alignment logic in step 47. Compaction, if performed, is based on the trigger settings and should be performed in step 48. Then the compacted entries should be loaded into the high speed FIFO memory along with their respective time stamps 49. And these FIFO entries should be removed and passed on to the collector system bus at that bus's speed 51 by the FIFO output logic. The collector system memory should be set to handle a continuous stream of data at the system bus speed, up to however many entries will be needed to achieve an average steady state function for the test to be useful. The entries should be loaded into that memory 52, and then, when the trace is completed, that memory should be pooled flushed out to disk or other permanent memory for later study 53. It should be clear from the discussion that in some embodiments there may be no alignment but compaction may be used, and vice versa. In some embodiments or settings, the user may desire not to use either, and a mode to allow that should be included in the apparatus.

Time Stamping and Coordination of other Collector Systems

The time stamp block 10 of FIG. 2 contains a time stamp register (not shown), which increments once for each sample clock received from line 8. The time stamp register is preferably a 48-bit up counter that wraps upon overflow. The number of bits from the time stamp register that can be passed into the data stream through the BC logic 206 can vary as preferred by design. The design objective is to allow a variety of selections that include no time-stamp data up to all available bits of the register (in the preferred embodiment 48 bits, and then restarting or rolling it over if the trace sequence is not yet finished).

The time stamp register begins counting when the collector system is "armed", that is, ready to collect trace data. Once armed one of two actions may occur.

If the collector system is in independent mode triggers do not cause time stamp register resets. Once the collector system is armed the time stamp register will count clocks until it is stopped.

Figure 8:
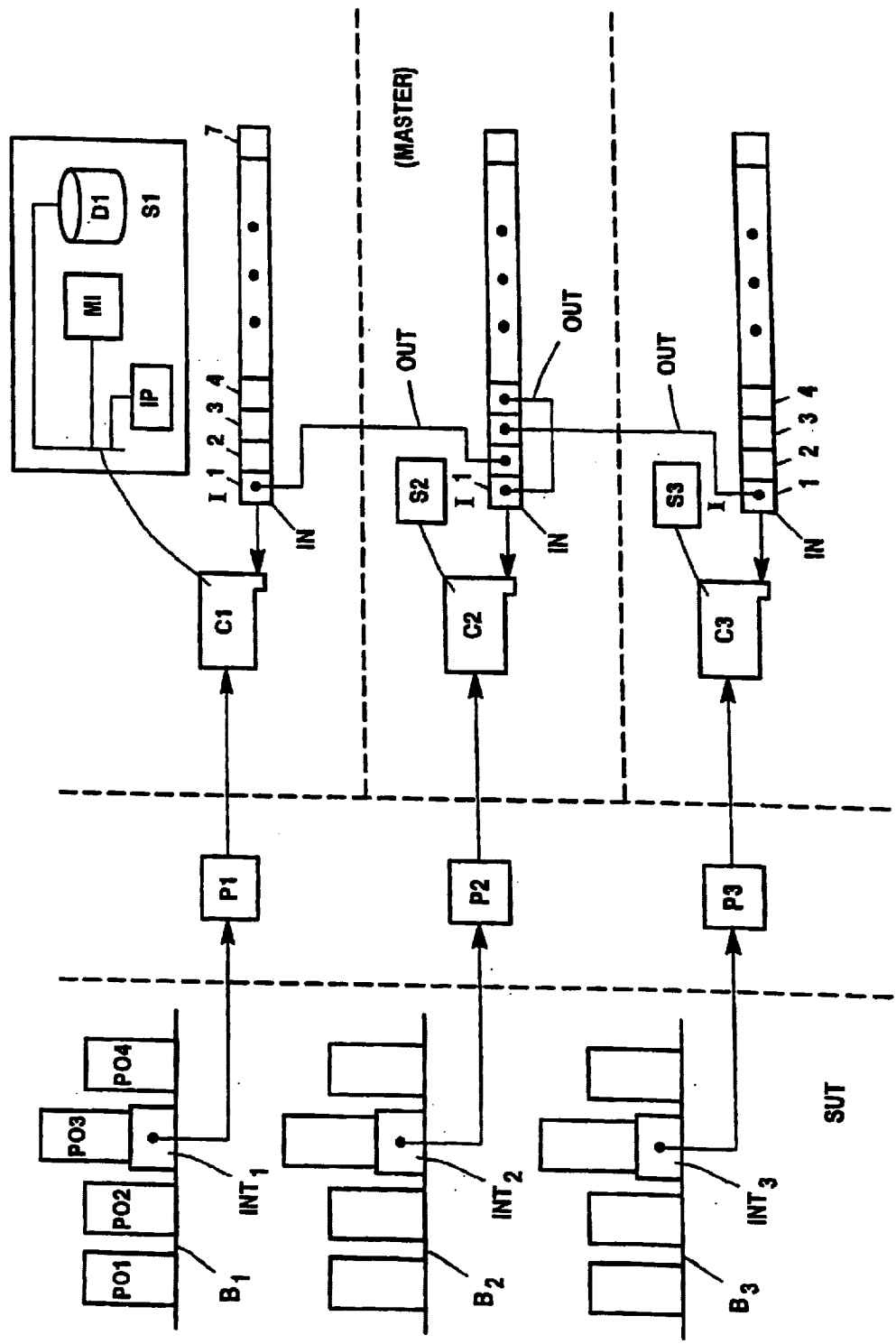
FIG. 8 is a block diagram of a plurality of collector systems set up to simultaneously record tracings from a multiprocessor computer system under test with multiple processor busses.

It is also possible to coordinate collector system tracings. A collector system can be used together with a group of similar collector systems to collect trace data at the same time from different instruction processor busses within a computer system under test or for collecting different kinds of signals from the SUT, or for collecting the same or different kinds of signals form multiple busses or interconnects within the SUT. The collector systems need not be identical to those described herein to provide this coordination, but they must use the time stamp features to associate entries with a time at which they occur. Such a task can be handled by a system of collector systems as is illustrated in FIG. 8. Here the computer system under test SUT has three interposer units (INT1–3) interposed between one of four instruction processors on each of busses B1–3. Each is connected to a probe P1–3, respectively as well. The probe output is directed to PCI cards C1–3, respectively of three different collector systems S1–S3, respectively, each of which will have a processor and main memory and long term storage associated with them. If each of the collector systems is in a slave mode, a pulse from a master unit (here, C2/S2) will cause the time stamp register to reset to zero. In the preferred embodiment the registers 1 are at least 8 bits in length and allow for a direct connection between each one and each other up to the number of registers (here 8) such collector systems. Thus, in the preferred embodiment, each collector system contains eight synchronize outputs and one synchronize input so one collector system can trigger collection among a group of 8 collector systems. A master output is connected to an input on each of the slave units and to the master synchronize input. When the master receives an "ARM" command, a pulse sent out the master synchronize output causes a time stamp register reset to occur in all slave devices and in the master device at the same time since the master unit's output is directed to its own input. The master is NOT in slave mode, thus using all outputs of the register to fire on the occurrence of the trigger, synchronizing itself and all its slaves simultaneously. Thus, all the time stamps in all the memories of all the slaves and masters should be occurring in synchronous rhythm and the stored signals in the trace data can be matched up across the disparate memories from each of the collector systems during study based on these time stamps.

The slaves and master are preferably all connected from initiation register 12-n to an arm register 11 by the same length of cable to enhance reliability of the time stamp alignment between collector systems. Also, each collector system may have been set to a different trigger and/or mode, so even though they may not all begin capturing data at the same time, the time stamp data can be used to coordinate all such collected tracings. It is preferred that a single clock source (preferably from the SUT), be used to drive all the time stamp clocks in the collector systems in the SUT so that the clocks in multiple collector systems remain in synchrony after initial synchronization. Matched clock sources in the collector systems could be used too, but this would be more difficult.

Figure 13:
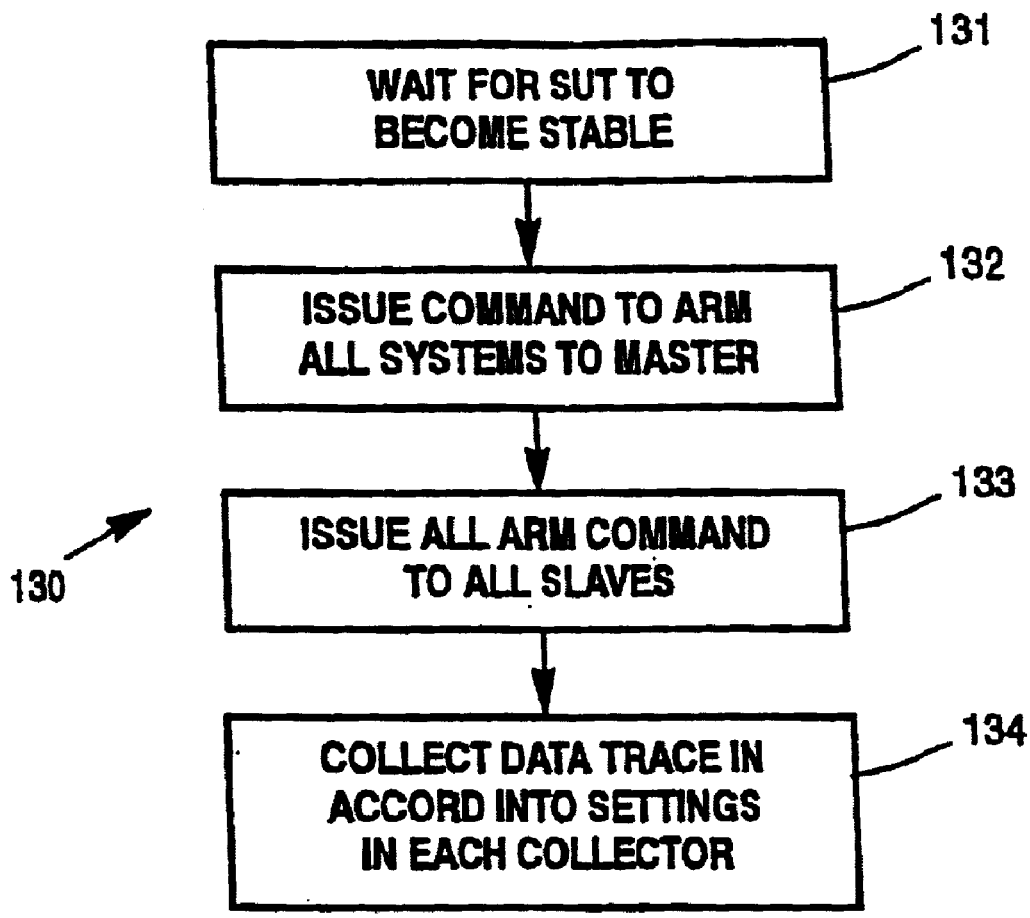
FIG. 13 is a flow chart.

Refer to FIG. 13 in which the process 130 is illustrated. The operator would first set program all the systems through a console on the master or on each collector system. This set up would provide the various collector systems with appropriate settings. The operator would then wait for the SUT to come to steady state 131 before issuing a command to initiate collection to the master collector system 132. The master system then sends an initiation pulse to any slave systems 133, which also sends the initiation pulse command to the master system as described above. The trace can then begin 134 in accord with the settings in each collector system as described above.

There are variations that can be understood to be within the ambit of this invention. Accordingly, the scope of the invention is only limited by the following appended claims.

What is claimed is:

1. An apparatus for collecting high-speed processor interconnect signals over a period of time sufficient for steady state effects to become manifest in as system under test, said apparatus comprising:

an input channel circuit for receiving all activity on a high speed processor interconnect in a system under test, a preview pipeline circuit connected to monitor said input channel for capturing all occurrences of said high-speed processor interconnect signals at processor speed, a trigger circuit maintaining a predetermined trigger value to compare against said all occurrences, and to trigger identification of all of said high-speed processor interconnect signals associated with each appearance of a trigger signal equivalent to said predetermined trigger value in said occurrences captured by said pipeline circuit and to pass each instance of said occurrences which are associated with a said appearance of a trigger signal as a word on to a compaction circuit, wherein said trigger may be set to at least one trigger value as desired by a user and wherein said trigger values correspond to processor ID values in said system under test, a time stamp generating circuit for generating a time stamp value signal for each said occurrence and associating a one of said time stamp values associated with a one of said each occurrences, said compaction circuit for eliminating any wasted space within said word and passing compacted sets of such words as an entry signal on to a high speed FIFO memory at said high speed processor interconnect speed, each of said worms in said compacted set of words being passed with an associated time stamp value signal, said high speed FIFO memory operating at said high-speed processor interconnect speed for receiving said entry signals at said high-speed processor interconnect speed and for providing that each of said entry signals is associated with a said associated one of said time stamp value signals, and for providing a said entry and its said associated time stamp value signals to an output channel.

2. The apparatus of claim 1, further comprising; a collector computer system having a channel connected to receive said entry signals from said output channel and to store them in a main memory for later flushing to a permanent memory system.

3. Apparatus as set forth in claim 2 wherein a console is associated with said collector computer system and wherein said console provides a user interface by which said trigger can be set to at least one trigger value as desired by a user at said console.

4. Apparatus as set forth in claim 3 wherein said trigger set to at least one trigger value as desired includes trigger values corresponding to address range values in said system under test.

5. Apparatus as set forth in claim 3 wherein said trigger set to at least one trigger value as desired includes trigger values corresponding to address/function values in said system under test.

6. Apparatus as set forth in claim 3 wherein said trigger set to at least one trigger value as desired includes pulse occurrences on identified lines of said input channel.

7. Apparatus as set forth in claim 1 wherein said input channel comprises an interposer interposed between a processor on a processor bus in a computer system under test and said preview pipeline circuit wherein said processor bus is said high-speed processor interconnect.

8. Apparatus as set forth in claim 1 wherein said FIFO memory has sufficient capacity for holding at least two kilo-entry signals.

9. Apparatus as set forth in claim 1 wherein said FIFO memory has sufficient capacity for holding between two kilo-entry and 16 kilo-entry signals.

10. Apparatus as set forth in claim 1 wherein said FIFO memory has sufficient capacity to handle anticipated burstiness of software in use on a system under test.

11. Apparatus as set forth in claim 1 wherein said compaction circuit comprises control logic settable to determine specific bytes of a word to be selected-down to.

12. Apparatus as set forth in claim 1 wherein said compaction circuit passing of an associated time stamp value signal with each word in an entry compacts said time stamp value signals such that for each entry signals associated with each word from said each entry only a predetermined one of said time stamp values is passed.

13. A method for collecting high speed processor signals over a period of time sufficient for steady state effects to be manifest in a tracing of such signals in a system under test, said method comprising:
   a. connecting to a high speed interconnect from which to receive processor signals from one processor only in a multiprocessor system on an input channel connected to said one processor's only connection to said input channel,
   b. receiving signals from said high speed interconnect at a clock speed matching said high speed interconnect in a collector computer system,
   c. setting up said collector computer system to receive said signals upon initiation of said collector computer system, whereupon said collector computer system monitors said input channel for said received signals and captures said received signals as input words,
   d. generating a time stamp value for each input word, and associating each generated time stamp value with a said input word signal,
   e. monitoring said input words for an appearance of a trigger signal said trigger signal identifying said one processor only, and
   f. storing only entry word signals associated with each said appearance of a trigger signal during a tracing period into a high speed FIFO memory together with its associated time stamp value as entry signals.

14. The method of claim 13 further comprising an additional step:
   g. passing entries from said FIFO to a collector system main memory for later flushing to permanent memory for study.

15. The method of claim 13 wherein in said connecting step (a) said connection to said high speed interconnect is made to a high speed processor bus and said processor signals are in a bus protocol format and wherein an additional step aligns each series of a bus protocol word series of signals into a single one of said entry words.

16. The method of claim 13 wherein said entry word signals associated with each said trigger signal comprise a predetermined number of said entry word signals immediately preceding an occurrence of a trigger signal plus a predetermined number of said entry word signals immediately following said an occurrence of said a trigger signal.

17. The method of claim 16 wherein at least one of said predetermined numbers of entry words is a zero.

18. The method of claim 13 wherein said step (f) further comprises compacting said entry words associated with a said trigger signal prior to said storing.

19. The method of claim 18 wherein said compacting comprises inputting said entry words associated with a said trigger signal into an array of select-down circuits, selecting only those bytes in a said entry word predetermined to contain data of interest, passing said selected down those bytes in an entry word predetermined to contain data of interest into a byte stuffer as an abbreviated entry word, and stuffing said abbreviated entry words into a stuffed entry word for transfer into a high speed FIFO memory.

20. The method of claim 19 wherein said stuffing into a stuffed entry word comprises stuffing a plurality of abbreviated entry words into a stuffed entry word.

* * * * *